(12) United States Patent
Kosako et al.

(10) Patent No.: US 10,328,628 B2
(45) Date of Patent: Jun. 25, 2019

(54) PROCESS FOR MANUFACTURING A HOLLOW BODY AND THE MANUFACTURED BODY

(71) Applicant: PLASTIC OMNIUM ADVANCED INNOVATION AND RESEARCH, Brussels (BE)

(72) Inventors: Seiji Kosako, Yokohama (JP); Eric Boucaux, Elincourt Sainte Marguerite (FR); Koichiro Shimotake, Kitakyushu (JP); Yong Chen, Wuhan (CN)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 14/781,204

(22) PCT Filed: Mar. 24, 2014

(86) PCT No.: PCT/EP2014/055869
§ 371 (c)(1),
(2) Date: Sep. 29, 2015

(87) PCT Pub. No.: WO2014/154645
PCT Pub. Date: Oct. 2, 2014

(65) Prior Publication Data
US 2016/0052188 A1    Feb. 25, 2016

(30) Foreign Application Priority Data

Mar. 29, 2013    (EP) ..................................... 13305418

(51) Int. Cl.
*B29C 49/04*    (2006.01)
*B29C 49/00*    (2006.01)
(Continued)

(52) U.S. Cl.
CPC .............. *B29C 49/04* (2013.01); *B29C 48/21* (2019.02); *B29C 48/2692* (2019.02);
(Continued)

(58) Field of Classification Search
None
See application file for complete search history.

(56) References Cited

U.S. PATENT DOCUMENTS

| 3,423,498 A |   | 1/1969 | Lefevre |
| 4,149,839 A | * | 4/1979 | Iwawaki ............. B29C 47/0023 |
|             |   |        | 425/133.1 |

(Continued)

FOREIGN PATENT DOCUMENTS

| DE | 10 2010 018 527 A1 | 10/2011 |
| DE | 10 2010 027 096 A1 | 1/2012 |

(Continued)

OTHER PUBLICATIONS

International Search Report dated Jun. 27, 2014 in PCT/EP2014/055869 filed Mar. 24, 2014.

*Primary Examiner* — Craig M Schneider
*Assistant Examiner* — David R Deal
(74) *Attorney, Agent, or Firm* — Oblon, McClelland, Maier & Neustadt, L.L.P.

(57) ABSTRACT

A process for manufacturing a diesel tank or filler pipe by an extrusion-blow molding machine configured to manufacture a gasoline tank or filler pipe. The extrusion-blow molding machine includes a coextrusion head including at least one extruder configured to provide during a first period of time a first material that is a barrier to liquids and/or gases, such that during the first period of time the coextrusion head produces a first multilayer parison from which the gasoline tank or filler pipe can be manufactured. The extruder is further configured to provide during a second period of time (Continued)

a second material distinct from the first material, such that during the second period of time the coextrusion head produces a second multilayer parison from which the diesel tank or filler pipe can be manufactured.

21 Claims, 3 Drawing Sheets

(51) Int. Cl.
| | |
|---|---|
| *B29C 49/22* | (2006.01) |
| *B60K 15/03* | (2006.01) |
| *B60K 15/04* | (2006.01) |
| *F16L 9/12* | (2006.01) |
| *B29C 48/21* | (2019.01) |
| *B29C 48/25* | (2019.01) |
| *B29L 23/00* | (2006.01) |
| *B29L 31/00* | (2006.01) |
| *B29K 23/00* | (2006.01) |
| *B29C 48/09* | (2019.01) |
| *B29C 48/22* | (2019.01) |
| *B29C 48/27* | (2019.01) |

(52) U.S. Cl.
CPC .......... *B29C 49/0005* (2013.01); *B29C 49/22* (2013.01); *B60K 15/03177* (2013.01); *B60K 15/04* (2013.01); *F16L 9/123* (2013.01); *B29C 48/09* (2019.02); *B29C 48/22* (2019.02); *B29C 48/2715* (2019.02); *B29K 2023/065* (2013.01); *B29K 2023/086* (2013.01); *B29K 2995/0067* (2013.01); *B29K 2995/0069* (2013.01); *B29L 2023/22* (2013.01); *B29L 2031/7172* (2013.01); *B60K 2015/03046* (2013.01)

(56) References Cited

U.S. PATENT DOCUMENTS

| | | | | |
|---|---|---|---|---|
| 4,659,531 | A * | 4/1987 | Ezaki | .................. B29C 47/0023 |
| | | | | 264/512 |
| 6,119,731 | A * | 9/2000 | Nakagawa | .............. B29C 49/04 |
| | | | | 138/121 |
| 6,467,943 | B1 * | 10/2002 | Maguire | ............. B01F 7/00175 |
| | | | | 141/83 |
| 7,166,253 | B2 | 1/2007 | Van Schaftingen et al. | |
| 7,858,016 | B2 * | 12/2010 | Van Schaftingen | ........................ |
| | | | | B29B 17/0042 |
| | | | | 264/173.14 |
| 8,092,070 | B2 * | 1/2012 | Maguire | ................. B01F 3/184 |
| | | | | 366/76.91 |
| 8,192,676 | B2 * | 6/2012 | Share | ...................... B29C 49/22 |
| | | | | 264/513 |
| 2009/0230074 | A1 * | 9/2009 | Toyoda | ............... B29C 49/0073 |
| | | | | 215/12.2 |
| 2010/0044927 | A1 * | 2/2010 | Criel | ................... B29C 47/0066 |
| | | | | 264/531 |
| 2010/0075089 | A1 * | 3/2010 | Inaba | ........................ B32B 1/02 |
| | | | | 428/36.91 |
| 2011/0213101 | A1 * | 9/2011 | Shi | .......................... C08L 67/02 |
| | | | | 525/437 |
| 2012/0074028 | A1 | 3/2012 | Martin et al. | |
| 2013/0059102 | A1 * | 3/2013 | Torchio | ................ B65D 1/0215 |
| | | | | 428/35.7 |
| 2013/0193139 | A1 | 8/2013 | Karsch | |
| 2013/0269868 | A1 | 10/2013 | Neizert | |
| 2015/0041462 | A1 * | 2/2015 | Nakazawa | ............. B29C 49/22 |
| | | | | 220/4.13 |
| 2016/0243746 | A1 * | 8/2016 | Kawai | .................... B29C 49/22 |

FOREIGN PATENT DOCUMENTS

| | | |
|---|---|---|
| DE | 10 2010 046 378 A1 | 3/2012 |
| EP | 1 110 697 A2 | 6/2001 |
| WO | 2010/142593 A1 | 12/2010 |
| WO | 2012/038018 A1 | 3/2012 |

\* cited by examiner

| Extruder N° | GASOLINE TANK production | | Step of purging | | DIESEL TANK production | | Step of purging | | GASOLINE TANK production |
|---|---|---|---|---|---|---|---|---|---|
| 16 | HDPE (low MI) + MR | ⇒ | | ⇒ | HDPE (low MI) + MR | ⇒ | | ⇒ | HDPE (low MI) + MR |
| 15 | Regrind | ⇒ | | ⇒ | Regrind | ⇒ | | ⇒ | Regrind |
| 14 | Adhesive | → | Stop BMM Change Materials purge Extruder 13 | → | Min Adhesive% | → | Stop BMM Change Materials purge Extruder 13 | → | Adhesive |
| 13 | EVOH | ⇒ | | ⇒ | HDPE (low MI) + ADHE | ⇒ | | ⇒ | EVOH |
| 12 | Adhesive | ⇒ | | ⇒ | Min Adhesive% | ⇒ | | ⇒ | Adhesive |
| 11 | HDPE (low MI) | ⇒ | | ⇒ | HDPE (low MI) | ⇒ | | ⇒ | HDPE (low MI) |
| | T1 | | T2 | | T3 | | T4 | | T5 |

| Extruder N° | GASOLINE TANK production | | Step of purging | | DIESEL TANK production | | Step of purging | | GASOLINE TANK production |
|---|---|---|---|---|---|---|---|---|---|
| 16 | HDPE (low MI) + MB | ⇒ | | ⇒ | HDPE (low MI) + MB | ⇒ | | ⇒ | HDPE (low MI) + MB |
| 15 | Regrind | ⇒ | | ⇒ | Regrind | ⇒ | | ⇒ | Regrind |
| 14 | Adhesive | → | Stop BMM Change Materials purge Extruders 12,13,14 | → | HDPE (low MI) | ⇒ | Stop BMM Change Materials purge Extruders 12,13,14 | → | Adhesive |
| 13 | EVOH | ⇒ | | ⇒ | HDPE (low MI) | ⇒ | | ⇒ | EVOH |
| 12 | Adhesive | ⇒ | | ⇒ | HDPE (low MI) | ⇒ | | ⇒ | Adhesive |
| 11 | HDPE (low MI) | ⇒ | | ⇒ | HDPE (low MI) | ⇒ | | ⇒ | HDPE (low MI) |
| | T6 | | T7 | | T8 | | T9 | | T10 |

PROCESS FOR MANUFACTURING A HOLLOW BODY AND THE MANUFACTURED BODY

FIELD OF THE INVENTION

The present invention relates to a process for manufacturing hollow bodies, and particularly fuel tanks and filler pipes for motor vehicles. More precisely, it relates to the manufacture of a thermoplastic diesel tank or filler pipe.

PRIOR ART

For clarity reason, the problems of the prior art are described hereafter only for the particular case of the production of diesel tanks and gasoline tanks for motor vehicles. It is to note that similar problems are encountered in the case of the production of diesel filler pipes and gasoline filler pipes for motor vehicles.

Thermoplastic fuel tanks are widely used in motor vehicles. Diesel vehicles are equipped with diesel tanks and gasoline (i.e. petrol) vehicles are equipped with gasoline tanks. A hybrid vehicle may be equipped either with a diesel tank or a gasoline tank.

Generally, the wall of a diesel tank is composed of a single thermoplastic layer. It is known to manufacture a diesel tank by means of an extrusion-blow moulding machine equipped with an extrusion head. The extrusion head is configured to extrude (i.e. provide) a monolayer thermoplastic parison. The extruded parison is then blown-moulded in a mould to form the wall of the diesel tank.

Generally, the wall of a gasoline tank is composed of a multilayer structure comprising at least one thermoplastic layer and at least one additional layer which, advantageously, may be formed from a material that is a barrier to liquids (particularly hydrocarbons) and/or gases. Preferably, the nature and the thickness of the barrier layer are chosen so as to minimize the permeability of the liquids and/or gases in contact with the wall of the gasoline tank. Preferably, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to the fuel. It is known to manufacture a gasoline tank by means of an extrusion-blow moulding machine equipped with a coextrusion head. The coextrusion head comprises a plurality of extruders (or channels), each of them being configured to extrude only one type of material. The coextrusion head co-extrudes in a synchronised manner the different layers of material in order to produce a multilayer parison. The multilayer parison is then blown-moulded in a mould to form the wall of the gasoline tank.

In the prior art approach for manufacturing diesel tanks and gasoline tanks it is necessary to use two distinct extrusion-blow moulding machines; one machine equipped with an extrusion head (for manufacturing monolayer plastic diesel tanks) and another machine equipped with a coextrusion head (for manufacturing multilayer plastic gasoline tanks).

More and more production sites are requested to manufacture both diesel and gasoline tanks. For example, production sites that have been originally organised to manufacture gasoline tanks are now requested to also manufacture diesel tanks.

The major drawback of using two distinct machines is that it is expensive and cumbersome. Not only the cost of the machines themselves is expensive, but also the cost related to the manufacturing and maintenance operations. In certain situation, the installation of two distinct machines at the same production site is not possible due to lack of space.

In view of the above-mentioned disadvantages, there is a need for a method that allows one production site to simply and efficiently manufacture different types of fuel tanks (or filler pipes), particularly diesel and gasoline tanks (or filler pipes), without the need of using distinct extrusion-blow moulding machines.

SUMMARY OF THE INVENTION

It is, therefore, one aspect of the present invention to provide for a process for manufacturing a diesel tank or filler pipe by means of an extrusion-blow moulding machine suitable for manufacturing a gasoline tank or filler pipe, the extrusion-blow moulding machine being equipped with a coextrusion head comprising at least one extruder being configured to provide during a first period of time a first material that is a barrier to liquids and/or gases, such that during said first period of time the coextrusion head produces a first multilayer parison from which the gasoline tank or filler pipe can be manufactured.

According to one aspect of the present invention, the extruder is further configured to provide during a second period of time a second material distinct from the first material, such that during said second period of time the coextrusion head produces a second multilayer parison from which the diesel tank or filler pipe can be manufactured.

Thus, it is proposed to manufacture a diesel tank or filler pipe by means of an extrusion-blow moulding machine that is usually used for manufacturing a gasoline tank or filler pipe. In other words, the approach of the present invention consists in using the same extrusion-blow moulding machine for manufacturing alternately (i.e. at different periods of time) diesel tanks (or filler pipes) and gasoline tanks (or filler pipes).

Preferably, the diesel tanks (or filler pipes) and gasoline tanks (or filler pipes) according to the invention are made of plastic.

The term "plastic" is understood to mean any material comprising at least one synthetic polymer resin.

The extrusion-blow moulding machine used in the process according to the invention comprises a coextrusion head. The coextrusion head is adapted to produce a multilayer parison.

The term "parison" is understood to mean a molten thermoplastic preform (that is generally extruded and has a cylindrical shape and/or that is in the form of cylindrical parison halves and/or sheets) (generally extruded), which is intended to form the wall of the tank after moulding, i.e. after an operation which consists in forming the parison, which is in the melt state, into the required shapes and dimensions using a mould in order to obtain a tank.

In a particular embodiment, the parison may be made up of two separate pieces, which may be two sheets, for example. Advantageously, these pieces can result from cutting one and the same extruded tubular parison as described in the document EP 1 110 697. According to this particular embodiment, once a single parison has been extruded, this parison is cut over its entire length, along two diametrically opposed lines, to obtain two separate portions (sheets).

According to the present invention, the coextrusion head is configured to produce alternately (i.e. at different periods of time) a first multilayer parison adapted to be blow-moulded in order to form the wall of a gasoline tank (or filler pipe), and a second multilayer parison adapted to be blow-moulded in order to form the wall of a diesel tank (or filler pipe).

Thus, unlike the known diesel tank (as described above in relation to the prior art), the wall of the diesel tank according to the present invention is composed of a thermoplastic multilayer structure.

Advantageously, the multilayer structure of the diesel tank (or filler pipe) according to the invention is composed of material that is distinct from (i.e. that is not) material that is a barrier to liquids and/or gases. In other words, the multilayer structure of the diesel tank (or filler pipe) according to the present invention does not comprise any barrier layer. The material cost of the diesel tank according to the present invention is effectively reduced.

Unlike a gasoline tank/filler pipe, a diesel tank/filler pipe doesn't require any barrier layer. The idea behind the present invention is to modify the operating mode of the extruder that is usually in charge of extruding the barrier layer. More precisely, in the present invention it is advantageously proposed to control such extruder in a manner such that:
  during a first period of time, it extrudes a barrier layer (also called hereafter first material); and
  during a second period of time, it extrudes a material that is not a barrier layer (also called hereafter second material), and vice-versa.

Thus, the extruder according to the present invention can operate according to two distinct operating modes.

In a preferred embodiment, the first material that is a barrier to liquids and/or gases is EVOH copolymer.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly, random copolymers, linear block copolymers, non-linear block copolymers, and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersity of their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, clays, salts and other inorganic derivatives, natural fibres or polymeric fibres. It is also possible to use multilayer structures consisting of stacked layers bonded together, comprising at least one of the polymers or copolymers described above.

In a particular embodiment, the second material (extruded by the extruder during the second period of time) is high density polyethylene (HDPE).

In another particular embodiment, the second material (extruded by the extruder during the second period of time) is a mixture of high density polyethylene (HDPE) and adhesive.

For example, the second material can consist of a mixture of about 50-80% by weight of HDPE and of about 20-50% by weight of adhesive. In a particular embodiment, the second material consists of a mixture of about 70% by weight of HDPE and of about 30% by weight of adhesive.

The adhesive most often used is generally a polymer adhesive in the form of a functionalized polyolefin. The term "functionalized polyolefin" is understood to mean any polyolefin comprising, in addition to the units derived from olefins, functional monomeric units. These may be incorporated either into the main chain of the polyolefin or into its side chains. They may also be incorporated directly into the backbone of these main and side chains, for example by the copolymerization of one or more functional monomers with the olefin monomer or monomers, or else they may result from the grafting of one or more functional monomers onto the said chains, after the polyolefin has been manufactured. Several functionalized polyolefins may also be used as a blend.

The functional monomeric units of the functionalized polyolefin may be chosen from carboxylic acids, dicarboxylic acids and the anhydrides corresponding to these diacids. These monomeric units generally come from the copolymerization or from the grafting of at least one unsaturated monomer possessing the same functional groups. Examples of monomers than can be used are, non-limitingly, acrylic acid, methacrylic acid, maleic acid, fumaric acid, itaconic acid, maleic anhydride, fumaric anhydride and itaconic anhydride. Preferably, the functional monomeric units come from the copolymerization or from the grafting of maleic anhydride.

Advantageously, before the start of the period of time during which the extruder provides the first material (that is a barrier to liquids and/or gases), respectively the second material (that is not a barrier to liquids and/or gases), said extruder is purged in order to remove from it the second material, respectively the first material.

Thus, it is proposed to purge the extruder each time a change of material has to be performed. In other words, a step of purging is performed before each transition between a barrier material (i.e. first material) and a thermoplastic based material free of barrier material (i.e. second material), or vice-versa. This purge is aiming at evacuating out of the extruder the remaining barrier material, respectively the thermoplastic based material, in order to allow the extruder to provide pure thermoplastic based material (i.e. devoid of barrier material), respectively pure barrier material (devoid of thermoplastic based material).

In a particular embodiment, blow-moulding operations continue during the step of purging, such that the manufacture of tanks (or filler pipes) continues. In this particular embodiment the manufacturing chain is not stopped.

In another embodiment, during the step of purging no blow-moulding operation is performed. Once the purged material (i.e. material evacuated out of the extruder) is extruded by the extruder, this purged material is collected and take away from the manufacturing chain. This purged material may be, for example, stored, destroyed or recycled (particularly if the purged material is HDPE).

In the particular case of a gasoline tank, it is important that the barrier layer is not mixed with another material that could damage its impermeability properties. Advantageously, the step of purging according to the present invention permits to avoid rupturing, damaging, or compromising the requisite fuel barrier properties and structural integrity of the fuel tank.

The extruder (that is usually in charge of extruding the barrier layer) can be purged with any suitable resin or material.

In a particular embodiment, the extruder can be purged with HDPE or LDPE (low density polyethylene).

In a preferred embodiment, the extruder can be purged with a mixture of HDPE and adhesive. Advantageously, the composition of the mixture of HDPE and adhesive can be made such that its viscosity is close to that of the barrier layer (for example, EVOH). This results in a faster purging of the extruder.

Advantageously, the coextrusion head comprises at least one another extruder that is usually in charge of extruding adhesive.

Generally, for a gasoline tank (or filler pipe), the barrier layer (for example EVOH) is surrounded on each side by an adhesive layer.

In a first advantageous embodiment, during said second period of time and when the second material (that is to be extruded during the second period of time by the extruder that is usually in charge of extruding the barrier layer) is HDPE, said another extruder is configured to provide HDPE.

Thus, it is proposed to replace the adhesive layer by a HDPE layer. By this way, the multilayer parison from which the diesel tank/filler pipe according to the present invention is manufactured can be made of thermoplastic layers only (i.e. no barrier layer and no adhesive layer). As a result, pure plastic diesel tank/filler pipe can be manufactured. The fact to replace the adhesive layer by a HDPE layer allows reducing the material cost of the diesel tank/filler pipe.

In a second advantageous embodiment, during said second period of time and when the second material (that is to be extruded during the second period of time by the extruder that is usually in charge of extruding the barrier layer) is a mixture of HDPE and adhesive, said another extruder is configured to provide an amount of adhesive that is lower than the amount of adhesive provided during said first period of time.

For example, the amount of adhesive extruded during the second period of time (i.e. period for manufacturing diesel tank/filler pipe) can be reduced up to 80% as compared to the amount of adhesive extruded during the first period of time (i.e. period for manufacturing gasoline tank/filler pipe). This allows reducing the material cost of the diesel tank/filler pipe.

In a particular embodiment, the coextrusion head comprises at least one additional extruder in charge of extruding HDPE and at least one additional extruder in charge of extruding recycled plastic (also called regrind).

In another embodiment, the coextrusion head can comprise other additional extruders, for example at least one extruder in charge of extruding a mat of fibres.

The term "recycled plastic" is understood to mean a plastic obtained by grinding up scrap obtained from various steps in the manufacture of fuel tanks according to the invention, or by grinding up spent fuel tanks at the end of their life.

According to another aspect of the present invention, there is provided a diesel tank or filler pipe comprising an inner layer comprising HDPE, at least one layer comprising HDPE, at least one layer comprising recycled plastic and an outer layer comprising HDPE.

According to yet another aspect of the present invention, there is provided a diesel tank or filler pipe comprising an inner layer comprising HDPE, at least one layer comprising a mixture of HDPE and adhesive, at least one layer comprising recycled plastic and an outer layer comprising HDPE.

BRIEF DESCRIPTION OF THE DRAWINGS

The present invention is illustrated, in a non limitative way, by the accompanying FIGS. 1 to 4.

FIG. 3 illustrates a manufacturing sequence of gasoline and diesel tanks, in accordance with a first particular embodiment of the invention; and FIG. 4 illustrates a manufacturing sequence of gasoline and diesel tanks, in accordance with a second particular embodiment of the invention.

DESCRIPTION OF THE INVENTION

Figure 1:
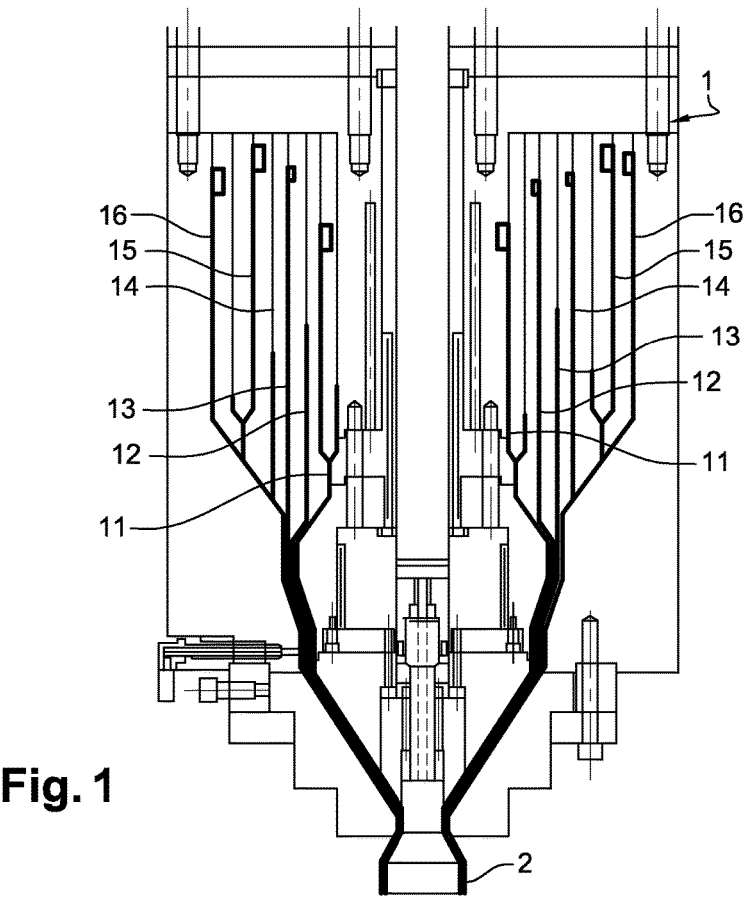
FIGS. 1 and 2 illustrate schematically a particular embodiment of a coextrusion head of an extrusion-blow moulding machine to which the present invention may be applied.

For clarity reason, the invention is described hereafter only for the particular case of the production of diesel tanks and gasoline tanks for motor vehicles. It is to note that the invention can be applied in the same manner to the case of the production of diesel filler pipes and gasoline filler pipes for motor vehicles.

The same reference numerals are used to indicate the same elements (or functionally-similar elements) throughout the separate FIGS. 1 to 4.

FIG. 1 is a cross sectional view of a coextrusion head 1 according to a particular embodiment of the present invention. The coextrusion head 1 is a part of an extrusion-blow moulding machine (not shown). The coextrusion head 1 is in charge of producing a multilayer parison 2.

In this particular embodiment, the coextrusion head 1 comprises six extruders 11, 12, 13, 14, 15 and 16. In another embodiment, the coextrusion head can comprise more than or less than six extruders. Each extruder is in charge of extruding a layer of material.

Figure 2:
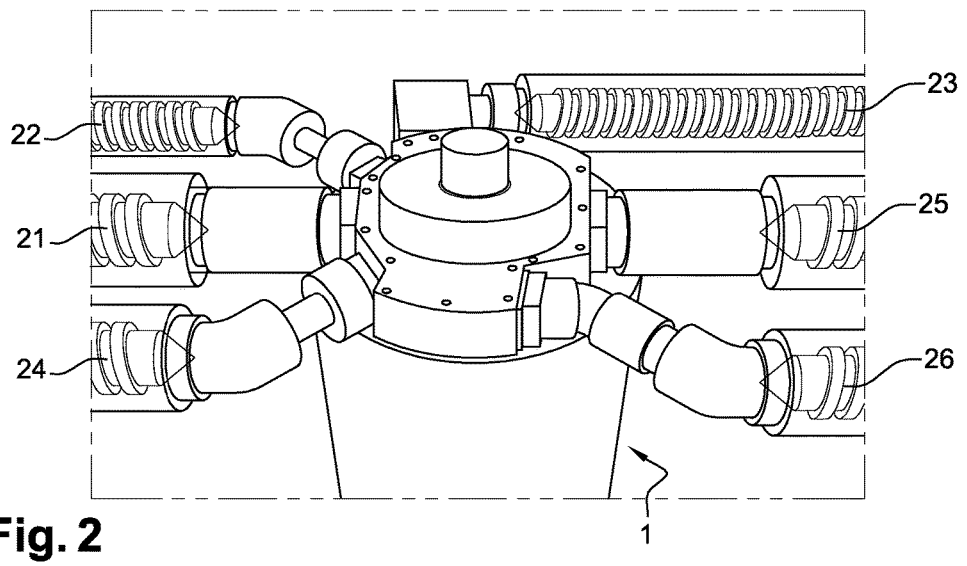

FIG. 2 is a 3D view of the top of the coextrusion head 1. In the example illustrated in FIG. 2, the coextrusion head 1 comprises six material feeding lines 21, 22, 23, 24, 25 and 26. Each feeding line is connected to one extruder of the coextrusion head 1. Each feeding line is in charge of distributing/pushing a material towards the extruder to which it is connected. In this example, the feeding line 21 is connected to the extruder 11, the feeding line 22 is connected to the extruder 12, the feeding line 23 is connected to the extruder 13, the feeding line 24 is connected to the extruder 14, the feeding line 25 is connected to the extruder 15, and the feeding line 26 is connected to the extruder 16.

According to a particular embodiment of the present invention, one side of the feeding line 23 can be connected to the extruder 13 and the other side of the feeding line 23 can be connected to the outlet port of a hopper (not shown). According to an advantageous embodiment, this hopper can comprise two inlet ports. For example, EVOH can entered in the hopper via the first inlet port and a mixture of HDPE and adhesive can entered in the hopper via the second inlet port. Opening and closing of the inlet ports can be advantageously controlled such that EVOH and the mixture of HDPE and adhesive enter one at a time in the hopper.

FIG. 3 illustrates a manufacturing sequence Si of gasoline and diesel tanks, in accordance with a first particular embodiment of the invention.

During a period of time T1, the extrusion-blow moulding machine is, for example, configured to manufacture one or several gasoline tanks. In this example, during the period of time T1 the coextrusion head 1 is configured to produce a multilayer parison comprising six layers of material. More precisely, during the period of time T1 the coextrusion head 1 is configured such that:

the extruder 11 extrudes (for example) HDPE;
the extruder 12 extrudes (for example) adhesive;

the extruder 13 extrudes (for example) EVOH;
the extruder 14 extrudes (for example) adhesive;
the extruder 15 extrudes (for example) recycled plastic; and
the extruder 16 extrudes (for example) HDPE (with or without additive).

During this period of time T1, the multilayer parison produced by the coextrusion head 1 is blow-moulded in a mould (not shown) to form the wall of a gasoline tank. In this example, the wall of the gasoline tank is composed of six layers of material arranged in the following order: an inner layer comprising HDPE, a layer comprising adhesive, a layer comprising EVOH, a layer comprising adhesive, a layer comprising recycled plastic and an outer layer comprising HDPE.

Before the start of a period of time T3 during which the extrusion-blow moulding machine is, for example, configured to manufacture one or several diesel tanks, the coextrusion head 1 is purged during a period of time T2. In this example, the extruder 13 is purged with a mixture of HDPE and adhesive. In other words, the mixture of HDPE and adhesive is introduced in the extruder 13 so as to push out the EVOH remaining in the extruder 13. The duration of the period of time T2 is such that it allows the complete evacuation of the EVOH out of the extruder 13.

Once the step of purging is completed, the manufacture of diesel tanks can start. As mentioned above, during the period of time T3 the extrusion-blow moulding machine is, for example, configured to manufacture one or several diesel tanks. In this example, during the period of time T3 the coextrusion head 1 is configured to produce a multilayer parison comprising six layers of material. More precisely, during the period of time T3 the coextrusion head 1 is configured such that:
the extruder 11 extrudes (for example) HDPE;
the extruder 12 extrudes (for example) adhesive;
the extruder 13 extrudes (for example) a mixture of HDPE and adhesive. Advantageously, this mixture is the same as the one used during the step of purging (i.e. period of time T2);
the extruder 14 extrudes (for example) adhesive;
the extruder 15 extrudes (for example) recycled plastic; and
the extruder 16 extrudes (for example) HDPE (with or without additive).

Advantageously, the amount of adhesive extruded by the extruder 12 and/or the extruder 14 during this period of time T3 can be lower than the amount of adhesive extruded by this extruder 12 and/or this extruder 14 during the period of time T1.

During this period of time T3, the multilayer parison produced by the coextrusion head 1 is blow-moulded in a mould (not shown) to form the wall of a diesel tank. In this example, the wall of the diesel tank is composed of six layers of material arranged in the following order: an inner layer comprising HDPE, a layer comprising reduced adhesive, a layer comprising a mixture of HDPE and adhesive, a layer comprising reduced adhesive, a layer comprising recycled plastic and an outer layer comprising HDPE.

Before switching from the manufacture of diesel tanks to the manufacture of gasoline tanks, the coextrusion head 1 is once again purged during a period of time T4. In this example, the extruder 13 is purged with EVOH. In other words, EVOH is introduced in the extruder 13 so as to push out the mixture of HDPE and adhesive remaining in the extruder 13. The duration of the period of time T4 is such that it allows the complete evacuation of the mixture of HDPE and adhesive out of the extruder 13.

Then, during a period of time T5, the extrusion-blow moulding machine is, for example, once again configured to manufacture one or several gasoline tanks. During this period of time T5, the coextrusion head 1 operates in the same way as described above with reference to the period of time T1.

The duration of the periods of time T1, T2, T3, T4 and T5 can be different. For example, the duration of the period of time T1 can be such that it allows the manufacture of 1000 gasoline tanks, the duration of the period of time T3 can be such that it allows the manufacture of 500 diesel tanks and the duration of the period of time T5 can be such that it allows the manufacture of 3000 gasoline tanks. For example, the duration of the period of time T2 can be around 2 hours and the duration of the period of time T4 can be more than 2 hours.

FIG. 4 illustrates a manufacturing sequence S2 of gasoline and diesel tanks, in accordance with a second particular embodiment of the invention.

During a period of time T6, the extrusion-blow moulding machine is, for example, configured to manufacture one or several gasoline tanks. In this example, during the period of time T6 the coextrusion head 1 is configured to produce a multilayer parison comprising six layers of material. More precisely, during the period of time T6 the coextrusion head 1 is configured such that:
the extruder 11 extrudes (for example) HDPE;
the extruder 12 extrudes (for example) adhesive;
the extruder 13 extrudes (for example) EVOH;
the extruder 14 extrudes (for example) adhesive;
the extruder 15 extrudes (for example) recycled plastic; and
the extruder 16 extrudes (for example) HDPE (with or without additive).

During this period of time T6, the multilayer parison produced by the coextrusion head 1 is blow-moulded in a mould (not shown) to form the wall of a gasoline tank.

As illustrated in the example of FIG. 4, the coextrusion head 1 is purged during a period of time T7. In this example, the extruders 12, 13 and 14 are purged with HDPE.

During a period of time T8 the coextrusion head 1 is configured such that:
the extruder 11 extrudes (for example) HDPE;
the extruder 12 extrudes (for example) HDPE;
the extruder 13 extrudes (for example) HDPE;
the extruder 14 extrudes (for example) HDPE;
the extruder 15 extrudes (for example) recycled plastic; and
the extruder 16 extrudes (for example) HDPE (with or without additive).

Advantageously, during this period of time T8 pure thermoplastic diesel tank (i.e. free of adhesive and free of EVOH) can be manufactured.

The invention claimed is:
1. A process for manufacturing a gasoline tank or a filler pipe for a gasoline tank, a diesel tank and/or a filler pipe for a diesel tank comprising
providing a extrusion-blow molding machine comprising
a coextrusion head comprising at least one extruder and configured to manufacture at different time periods, a first multilayer parison comprising a barrier layer and a second multilayer parison that does not comprise a barrier layer, and
said extruder being connected to a feeding line which is connected to a hopper, said hopper being connected
by a first inlet to a source of a first material for pushing said first material towards said extruder to form said barrier layer of said first multilayer parison and
by a second inlet to a source for a second material for pushing said second material towards said extruder to form said non-barrier layer of said second multilayer parison,
wherein said first inlet and said second inlet are controlled such that said first material and said second material enter the hopper one at a time;
during a first period of time
extruding the first multilayer parison comprising the first material with the extrusion-blow molding machine, and
blow-molding the first multilayer parison to form a gasoline tank or a filler pipe for a gasoline tank;
during a second period of time
stop pushing said first material towards the extruder by closing the first inlet, and
start pushing said second material towards the extruder by opening the second inlet;
during a third period of time
extruding the second multilayer parison comprising the second material with the extrusion-blow molding machine, and
blow-molding the second multilayer parison to form a diesel tank or a filler pipe for a diesel tank;
wherein the first material is a fuel-impermeable resin, and wherein the second material is high density polyethylene or a mixture of high density polyethylene and adhesive.

2. The process according to claim 1, wherein the first material is EVOH copolymer.

3. The process according to claim 1, wherein after said second period the extruder is purged to remove from the extruder the second material.

4. The process according to claim 1, wherein the coextrusion head comprises at least one additional extruder configured to provide adhesive.

5. The process according to claim 4, wherein during the second period of time and when the second material is high density polyethylene (HDPE), the additional extruder is configured to provide high density polyethylene (HDPE).

6. The process according to claim 4, wherein during the second period of time and when the second material is a mixture of high density polyethylene (HDPE) and adhesive, the additional extruder is configured to provide an amount of adhesive that is lower than the amount of adhesive provided during the first period of time.

7. The process according to claim 1, wherein after said first period the extruder is purged to remove from the extruder the first material.

8. The process according to claim 1, wherein the first period of time gasoline tanks are produced.

9. The process according to claim 1, wherein the first period of time filler pipes for gasoline tanks are produced.

10. The process according to claim 4, wherein the second period of time diesel tanks are produced.

11. The process according to claim 4, wherein the second period of time filler pipes for diesel tanks are produced.

12. The process according to claim 4, wherein the first period of time and the second period of time are repeated in alternating order.

13. The process according to claim 12, wherein during each repeated first period of time the same product is produced.

14. The process according to claim 13, wherein during each repeated first period of time gasoline tanks are produced.

15. The process according to claim 12, wherein during each repeated second period of time the same product is produced.

16. The process according to claim 15, wherein during each repeated second period of time diesel tanks are produced.

17. The process according to claim 12, wherein during each repeated first period of time different products are produced.

18. The process according to claim 12, wherein during each repeated second period of time a different products are produced.

19. The process according to claim 12, wherein between each repeated period of time the extruder is purged.

20. The process according to claim 12, wherein during each repeated first period of time gasoline tanks are produced and during each repeated second period of time diesel tanks are produced.

21. The process according to claim 20, wherein between each repeated period of time the extruder is purged.

* * * * *